US007593291B2

(12) United States Patent
Ito

(10) Patent No.: US 7,593,291 B2
(45) Date of Patent: Sep. 22, 2009

(54) CALENDAR TIMER MECHANISM, MEDICAL IMAGE PROCESSING SYSTEM, AND CONTROL PROGRAM

(75) Inventor: Tomohiko Ito, Sendai (JP)

(73) Assignee: FUJIFILM Corporation, Tokyo (JP)

( * ) Notice: Subject to any disclaimer, the term of this patent is extended or adjusted under 35 U.S.C. 154(b) by 758 days.

(21) Appl. No.: 10/926,227

(22) Filed: Aug. 26, 2004

(65) Prior Publication Data

US 2005/0047279 A1 Mar. 3, 2005

(30) Foreign Application Priority Data

Aug. 27, 2003 (JP) ............................ 2003-303513

(51) Int. Cl.
*G04B 47/00* (2006.01)
*G03G 21/14* (2006.01)
*G05D 17/00* (2006.01)

(52) U.S. Cl. ........................... 368/10; 399/77; 700/296

(58) Field of Classification Search .................. 368/28, 368/89, 203, 204, 10; 700/295, 296; 399/70, 399/77, 88; 713/300; 236/46 R
See application file for complete search history.

(56) References Cited

U.S. PATENT DOCUMENTS 3,983,928 A * 10/1976 Barnes ....................... 165/238
4,521,869 A * 6/1985 Moss et al. ................. 713/502
4,997,029 A * 3/1991 Otsuka et al. ............... 165/209
5,088,645 A * 2/1992 Bell ......................... 236/46 R
5,344,068 A * 9/1994 Haessig ....................... 236/47
5,719,826 A * 2/1998 Lips ........................... 368/29
5,721,936 A 2/1998 Kikinis et al.
5,809,369 A * 9/1998 Furuya et al. ................. 399/70
6,141,005 A * 10/2000 Hetherington et al. ...... 715/866
6,166,355 A 12/2000 Watanabe et al.
6,188,182 B1 * 2/2001 Nickols et al. .............. 315/294
6,191,563 B1 2/2001 Bangerter
6,414,005 B1 * 7/2002 Makino ...................... 514/383
6,462,437 B1 10/2002 Marmaropoulos et al.
6,658,303 B2 * 12/2003 Hatemata et al. .............. 700/14
6,895,309 B2 * 5/2005 Ito ............................ 700/296
2002/0154652 A1 * 10/2002 Yoshimura et al. .......... 370/442
2003/0163747 A1 * 8/2003 Yoshikawa .................. 713/323
2003/0202428 A1 10/2003 Ito
2004/0178683 A1 * 9/2004 Hermetz et al. ............. 307/141
2005/0083786 A1 * 4/2005 Tsai ............................ 368/30

FOREIGN PATENT DOCUMENTS

JP 60-54008 A 3/1985
JP 61-145481 A 7/1986
JP 6-337727 A 12/1994
JP 8-166641 A 6/1996

(Continued)

*Primary Examiner*—Vit W Miska
(74) *Attorney, Agent, or Firm*—Sughrue Mion, PLLC

(57) ABSTRACT

Based on regional calendar data including weekday information and holiday information, days of a month to be set are displayed as date buttons in a nonconsultation day setting image. A WORK button, an ALL button, a PM button or an AM button may be clicked to set consultation days and nonconsultation days for each day or weekday. The amount of energy consumed by an image forming apparatus is reduced by an energy saving mode in a preset nonbusiness time zone on nonbusiness days, and on Sundays and holidays which are not working days.

18 Claims, 11 Drawing Sheets

| MODE | ENERGY SAVING EFFECT | RISING TIME |
|---|---|---|
| ENERGY SAVING MODE (1) | D | A |
| ENERGY SAVING MODE (2) | C | B |
| ENERGY SAVING MODE (3) | B | C |
| OFF MODE (ENERGY SAVING MODE (4)) | A | D |

FOREIGN PATENT DOCUMENTS

| | | | |
|---|---|---|---|
| JP | 9-15825 | A | 1/1997 |
| JP | 9-033677 | A | 2/1997 |
| JP | 9-34317 | A | 2/1997 |
| JP | 9-251085 | A | 9/1997 |
| JP | 10-39670 | A | 2/1998 |
| JP | 11-146103 | A | 5/1999 |
| JP | 2000-295768 | A | 10/2000 |
| JP | 2000-330648 | A | 11/2000 |
| JP | 2000-347490 | A | 12/2000 |
| JP | 2001-142588 | A | 5/2001 |
| JP | 2001-356622 | A | 12/2001 |
| JP | 2002-292973 | A | 10/2002 |
| JP | 2002-300281 | A | 10/2002 |
| JP | 2003-285505 | A | 10/2003 |

* cited by examiner

FIG. 4

| ENERGY SAVING MODE | DISPLAY PANEL | MOTOR | HEATER |
|---|---|---|---|
| (1) | OFF | ON | ON (NORMAL) |
| (2) | OFF | OFF | ON (NORMAL) |
| (3) | OFF | OFF | ON (LOWER TARGET TEMPERATURE) |
| (4) (OFF MODE) | OFF | OFF | OFF |
| (5) | OFF | ON | ON (LOWER TARGET TEMPERATURE) |
| (6) | OFF | ON | OFF |

FIG. 5

| MODE | ENERGY SAVING EFFECT | RISING TIME |
|---|---|---|
| ENERGY SAVING MODE (1) | D | A |
| ENERGY SAVING MODE (2) | C | B |
| ENERGY SAVING MODE (3) | B | C |
| OFF MODE (ENERGY SAVING MODE (4)) | A | D |

FIG. 6

| DAY | FORENOON (9:00~) | AFTERNOON (12:00~1:00, 2:00) | EVENING (17:00~) |
|---|---|---|---|
| MONDAY | OFF MODE→ON MODE | ON MODE→(1)→ON MODE | ON MODE→(3) |
| TUESDAY | (3)→ON MODE | ON MODE→(1)→ON MODE | ON MODE→OFF MODE |
| WEDNESDAY (NONCONSULTATION DAY) | OFF MODE | OFF MODE | OFF MODE |
| THURSDAY | OFF MODE→ON MODE | ON MODE→(1)→ON MODE | ON MODE→(3) |
| FRIDAY | (3)→ON MODE | ON MODE→(2)→ON MODE | ON MODE→OFF MODE |
| SATURDAY (NONCONSULTATION DAY) | OFF MODE | OFF MODE | OFF MODE |
| SUNDAY (NONCONSULTATION DAY) | OFF MODE | OFF MODE | OFF MODE |

CALENDAR TIMER MECHANISM, MEDICAL IMAGE PROCESSING SYSTEM, AND CONTROL PROGRAM

BACKGROUND OF THE INVENTION

1. Field of the Invention

The present invention relates to a calendar timer mechanism for turning on and off a controlled object at preset times and changing preset times as desired, a medical image processing system, and a control program.

2. Description of the Related Art

In the image forming field, for example, there are employed image forming apparatus for forming an image captured by an ultrasonic diagnosis, a CT diagnosis, an MRI diagnosis, or an X-ray diagnosis as a visible image on a recording medium such as a photosensitive thermal-development recording medium, for example.

Such image forming apparatus usually have a drum housing a heater such as a halogen lamp or the like and an endless belt trained around about two-thirds of the circumferential surface of the drum and drivable by the drum. When the drum is rotated, a photosensitive thermal-development recording medium is inserted between and fed by the drum and the endless belt. During this time, the heater is energized to heat the photosensitive thermal-development recording medium to thermally develop an image thereon into a visible image.

The image forming apparatus are generally installed in hospitals and other medical facilities. It is customary for such installation sites to have predetermined periods of time during which the image forming apparatus are to be operated for each of the days of the week. It is desirable to schedule times to turn on and off the power supply of the image forming apparatus for each day and automatically control the operation of the image forming apparatus according to the established schedule.

There has been known an automatic operation control system for automatically controlling the operation of an apparatus (see, for example, Japanese Laid-Open Patent Publication No. 6-337727). The known automatic operation control system presets times to turn on and off the power supply of the apparatus to be automatically controlled, selects subsequent times to turn on and off the power supply from the preset times, and sets the selected times in a calendar timer device. When one of the set times is reached, the calendar timer device generates a signal to control the power supply.

According to the above automatic operation control system, it is not necessary for the operator to perform external manual control actions each time the power supply is to be turned on and off, instead the power supply can automatically be turned on and off by setting a schedule for the power supply control timing one time.

The applicant of the present application has proposed a calendar timer mechanism disclosed in U.S. patent application Ser. No. 10/396,468 as an effective energy saving mechanism. The disclosed calendar timer mechanism controls a processing apparatus to easily perform efficient and economic processing operations.

SUMMARY OF THE INVENTION

The present invention has been made in reference to the invention of U.S. patent application Ser. No. 10/396,468.

It is an object of the present invention to provide a calendar timer mechanism which makes it possible to set times flexibly in an energy saving mode for not only weekdays but also holidays, together with a medical image processing system and a control program.

According to the present invention, there are provided a calendar timer mechanism, a medical image processing system including a calendar timer mechanism, and a control program for controlling the calendar timer mechanism. The calendar timer mechanism is switchable between a normal mode for supplying energy to a controlled object and at least one energy saving mode for reducing the amount of energy consumed by the controlled object, according to a timer. Based on calendar data, including weekday information and holiday information, which is capable of setting a working day and/or a nonbusiness day for each day or weekday, the amount of energy consumed by the controlled object is reduced by the energy saving mode in a preset nonbusiness time zone on nonbusiness days, and on Sundays and holidays which are not working days.

By setting a working day and/or a nonbusiness day for each day or weekday using the calendar data, the controlled object can be set to the energy saving mode in a preset nonbusiness time zone on nonbusiness days and on Sundays and holidays which are not working days. Thus, the amount of energy consumed by the controlled object can easily be reduced.

The calendar data can be set for a half-day holiday for each day or weekday, and the amount of energy consumed by the controlled object is reduced by the energy saving mode in a half-day holiday time zone included within preset information concerning the set half-day holiday. The controlled object is therefore compatible with half-day holidays.

If the nonbusiness time zone can be set to include an afternoon time zone of a day preceding nonbusiness days and Sundays and holidays which are not working days, and a forenoon time zone of a day following nonbusiness days and Sundays and holidays which are not working days, then the nonbusiness time zone can be extended without changing the settings for the preceding day and the following day.

The calendar data may be selectable from a plurality of regional data and/or yearly data having different holiday information. Thus, regional and yearly calendars can be applied to allow the controlled object to set the energy saving mode to match different holidays in various regions of the world through simple control actions.

If there are a plurality of processing apparatus each as the controlled object, and the calendar data with working day information and/or nonbusiness day information set therein can be shared and set by the processing apparatus, then it is not necessary to make settings for each of the processing apparatus, and the time required to make such settings is greatly reduced.

Summer time information including period information and offset time information may be set, and the energy saving mode may be performed at a time shifted by a time represented by the offset time information in a period represented by the period information.

The normal mode may comprise an ON mode for turning on the controlled object, the energy saving mode may include an OFF mode for turning off the controlled object and at least two auxiliary energy saving modes for selectively bringing the controlled object into an OFF state or a low power consumption state, and times required to shift between at least three of the modes may be set optionally.

Specifically, the energy saving effect of the controlled object and the rising time thereof involve countervailing factors. If a large energy saving effect is to be obtained, then the rising time becomes long. Therefore, if the preset shutdown period is long, then a mode with a large energy saving effect (a long rising time) is selected. If the shutdown period is short, then a mode with a short rising time (a small energy saving effect) is selected. Consequently, it is possible to put the energy saving effect and the rising time into a desired balance, allowing improved energy savings for the controlled object as a whole.

The controlled object, which is to be controlled to save energy, may comprise an image forming apparatus having an exposure unit for applying a light beam to a recording medium and a thermal development device having a heat source for developing an image on the recording medium.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram illustrating energy saving modes provided by the calendar timer mechanism;

FIG. 5 is a diagram showing the relationship between energy saving effects of energy saving modes (1) through (3) and an OFF mode and rising times;

FIG. 6 is a diagram showing the format of settings produced by the calendar timer mechanism used in a hospital;

DESCRIPTION OF THE PREFERRED EMBODIMENT

Figure 1:
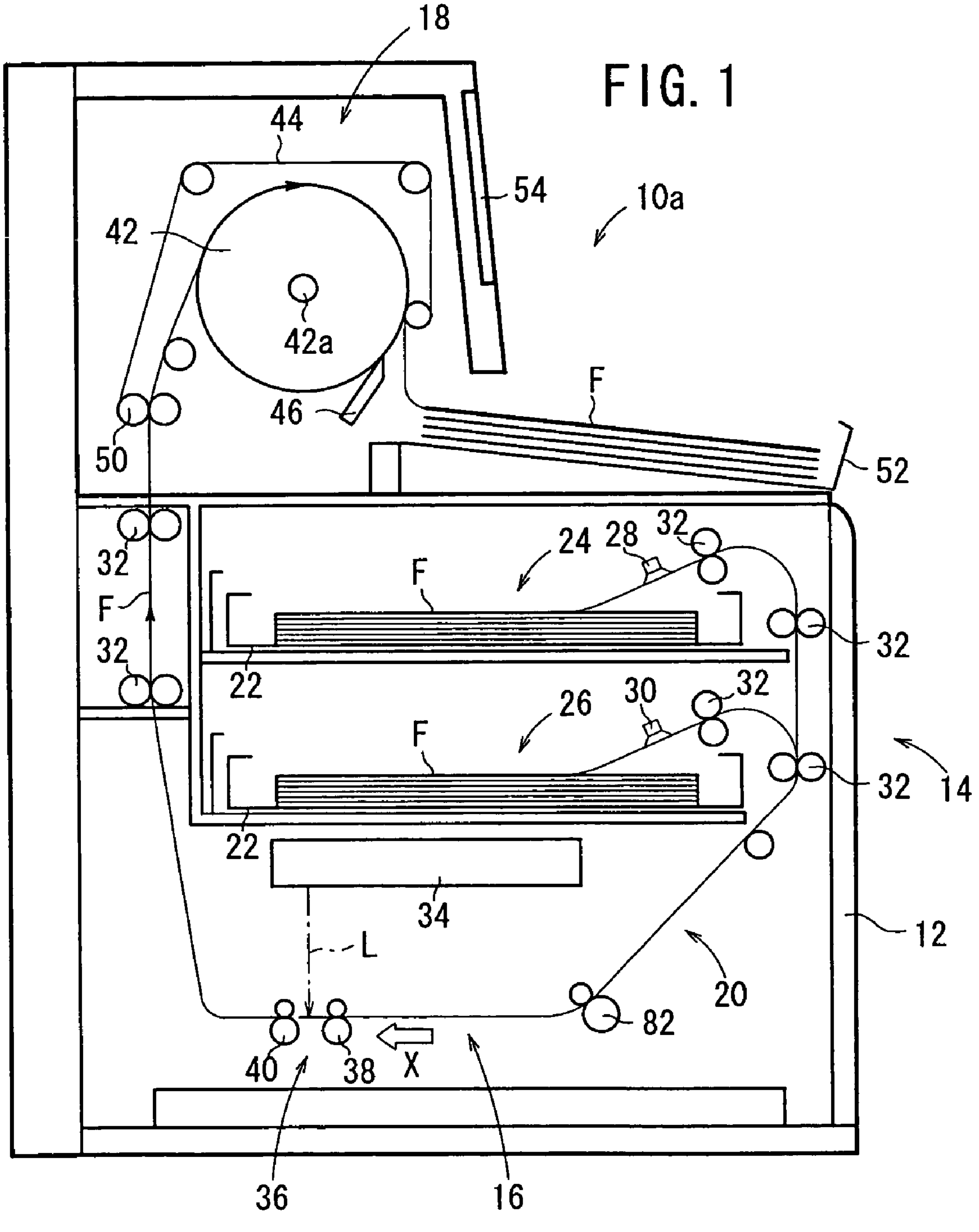
FIG. 1 is a schematic vertical cross-sectional view of an image forming apparatus incorporating therein a calendar timer mechanism according to an embodiment of the present invention.

FIG. 1 shows in schematic vertical cross section an image forming apparatus (processing apparatus) 10*a* incorporating therein a calendar timer mechanism according to an embodiment of the present invention.

As shown in FIG. 1, the image forming apparatus 10*a* has a casing 12 housing therein a photosensitive medium supply device 14, an image exposure device 16, and a thermal development device 18, which are successively connected by a feeder 20 in the direction in which a recording medium (photosensitive thermal-development recording medium) F is to be fed. The photosensitive medium supply device 14 has a pair of upper and lower loaders 24, 26 each supplied with a magazine 22 housing a predetermined number of stacked recording mediums F therein. The loaders 24, 26 comprise respective sheet feeding means, having respective suction cups 28, 30. Feed roller pairs 32 of the feeder 20 are disposed in positions for receiving recording mediums F that are removed from the magazines 22 by the suction cups 28, 30.

The image exposure device 16 has an exposure unit 34 for applying a light beam L that is periodically deflected in a main scanning direction to a recording medium F supplied from the photosensitive medium supply device 14, and an auxiliary scanning feeding means 36 for feeding the recording medium F in an auxiliary scanning direction (indicated by the arrow X) that is substantially perpendicular to the main scanning direction. The exposure unit 34 comprises a known light beam scanner. The auxiliary scanning feeding means 36 comprises a pair of feed roller pairs 38, 40.

The thermal development device 18 comprises a heating drum 42, an endless belt 44, and a peeler blade 46. The heating drum 42 houses therein a heating light source such as a halogen lamp or the like or a heat source such as a heater or the like. In the present embodiment, the heating drum 42 houses a heater 48 therein (see FIG. 2).

The heating drum 42 has a surface heated to and kept at a temperature depending on the thermal development temperature of the recording medium F. When the heating drum 42 is rotated about its own shaft 42*a*, the heating drum 42 and the endless belt 44 sandwich and feed the recording medium F along the outer circumferential surface of the heating drum 42. The endless belt 44 is trained around a plurality of rollers 50 and also around a certain range of the outer circumferential surface of the heating drum 42.

A tray 52 for placing thereon a stack of recording mediums F, which have been thermally developed by the thermal development device 18, is disposed on an upper surface of the casing 12. A display panel 54 as a display unit is mounted on a front wall of the casing 12 above the tray 52.

Figure 2:
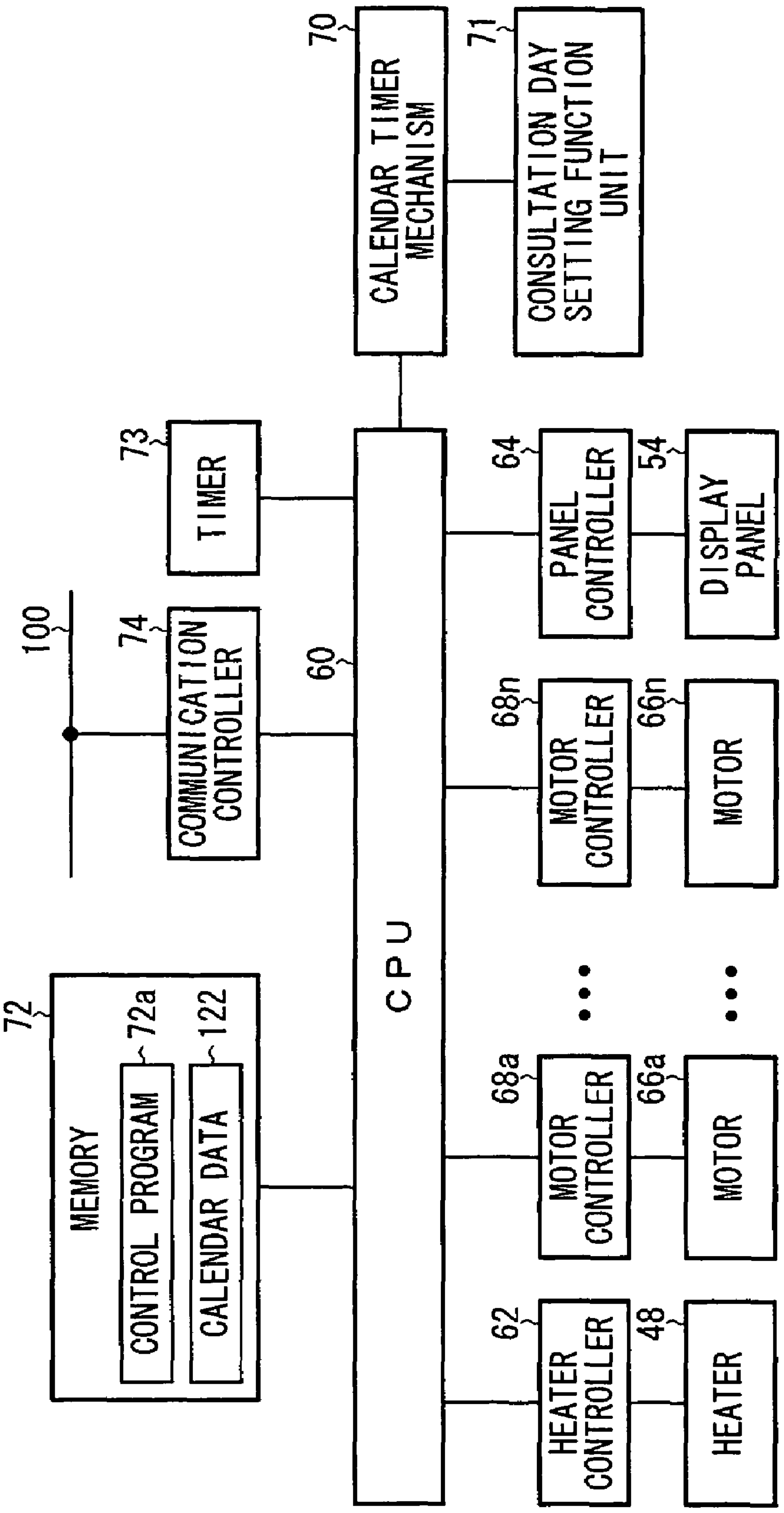
FIG. 2 is a block diagram of a control system of the image forming apparatus shown in FIG. 1.

As shown in FIG. 2, a control system of the image forming apparatus 10*a* has a CPU (Central Processing Unit) 60 for controlling the image forming apparatus 10*a*. To the CPU 60, there are connected a heater controller 62 for controlling the heater 48, a panel controller 64 for controlling the display panel 54, and motor controllers 68*a* through 68*n* for controlling respective motors 66*a* through 66*n* of the sheet feeding means, the feeder 20, and the auxiliary scanning feeding means 36.

To the CPU 60, there are also connected a calendar timer mechanism 70 for automatically controlling the image forming apparatus 10*a* according to the present invention, and a memory 72. The memory 72 stores settings with respect to turning on and off the image forming apparatus 10*a* by the calendar timer mechanism 70, as described later. The calendar timer mechanism 70 can gain access to the timer 73 through the CPU 60 for recognizing times and dates, and is associated with a consultation day setting function unit 71 for setting energy saving modes for holidays.

The memory 72 includes a nonvolatile storage area for holding preset data even when the power supply thereof is turned off. The memory 72 stores a program such as a control program 72*a* which is read and executed by the CPU 60 for controlling operation of the image forming apparatus 10*a*, and data such as calendar data 122, as described later.

A communication controller 74 for communicating with other apparatus through a network 100 is connected to the CPU 60.

Figure 3:
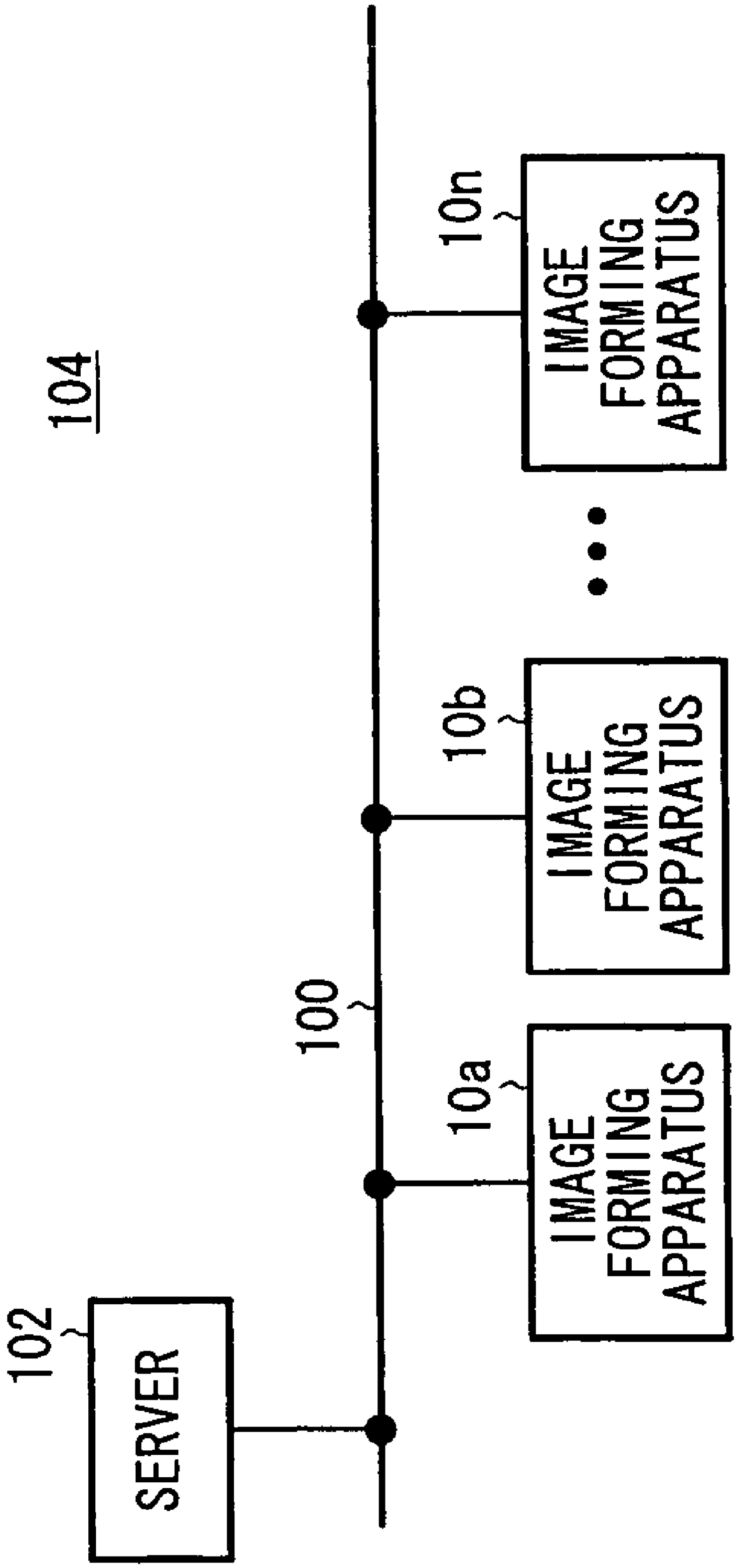
FIG. 3 is a block diagram of an image forming apparatus network system wherein a plurality of image forming apparatus are connected to a network.

As shown in FIG. 3, the image forming apparatus 10*a* is connected to the network 100 for communicating with other apparatus that are connected to the network 100. Specifically, the image forming apparatus 10*a*, image forming apparatus 10*b*, 10*c*, . . . 10*n*, and a server 102 that acts as a management computer are connected to the network 100, making up an image forming apparatus network system 104 as a whole. Each of the image forming apparatus 10*b*, 10*c*, . . . 10*n* is similar to the image forming apparatus 10*a*, and has at least the CPU 60, the calendar timer mechanism 70, the consultation day setting function unit 71, the memory 72, and the communication controller 74.

Operation of the calendar timer mechanism 70 thus constructed will be described below in relation to the image forming apparatus 10*a*, which incorporates the calendar timer mechanism 70 therein, and also the image forming apparatus network system 104. In the operations described below, the calendar timer mechanism 70 operates based on a given program in cooperation with the CPU 60 and the memory 72. The program is read from an external recording medium, a wide-area communication network, or the like, into a program storage area of the memory 72 by the CPU 60, and then executed by the CPU 60.

The image forming apparatus 10*b*, 10*c*, . . . 10*n* have functions similar to those of the image forming apparatus 10*a* in terms of the calendar timer mechanism 70 and the consultation day setting function unit 71. The image forming apparatus 10*a* will mainly be described below by way of example.

The calendar timer mechanism 70 can set an OFF mode in which all controlled objects (the heater 48, the display panel 54, and the motors 66*a* through 66*n*) of the image forming apparatus 10*a* are shut off and operation of the image forming apparatus 10*a* is halted for a relatively long period of time, an ON mode in which all the controlled objects are turned on, i.e., the image forming apparatus 10*a* is in normal operation, and energy saving modes (1) through (6) to be described below.

Specifically, as shown in FIG. 4, in the energy saving mode (1), the display panel 54 is turned off, and the motors 66*a* through 66*n* and the heater 48 are turned on. In the energy saving mode (2), the display panel 54 and the motors 66*a* through 66*n* are turned off, and the heater 48 is turned on.

In the energy saving mode (3), the display panel 54 and the motors 66*a* through 66*n* are turned off, and the heater 48 is turned on at a lowered target temperature, i.e., in a low power consumption state. In the energy saving mode (4), the display panel 54, the motors 66*a* through 66*n*, and the heater 48 are turned off. Therefore, the energy saving mode (4) corresponds to the OFF mode.

In the energy saving mode (5), the display panel 54 is turned off, the motors 66*a* through 66*n* are turned on, and the heater 48 is turned on at a lowered target temperature. In energy saving mode (6), the display panel 54 and the heater 48 are turned off, and the motors 66*a* through 66*n* are turned on.

The OFF mode may be referred to as a type of energy saving mode, from the viewpoint of reduced power consumption, and the energy saving modes (1), (2), (3), (5) and (6) may be referred to as auxiliary energy saving modes (energy saving sub-modes). The normal ON mode may be referred to as a normal mode.

In the present embodiment, the energy saving modes (1) through (3), the OFF mode, and the ON mode are selected, and times at which to shift between these modes are set as desired depending on the demands of the user of the image forming apparatus 10*a*. FIG. 5 shows the relationship between energy saving effects of the energy saving modes (1) through (3) and the OFF mode and rising times. As shown in FIG. 5, the energy saving effects of the energy saving modes (1) through (3) and the OFF mode are progressively higher from D to A, and the rising times are progressively shorter from D to A.

For example, in the energy saving mode (1), only the display panel 54 is turned off. Though the energy saving effect of the energy saving mode (1) is smaller than the energy saving effects of the other modes, the rising time of the energy saving mode (1) is extremely short because the image forming apparatus 10*a* becomes operational immediately when the display panel 54 is turned on. In the OFF mode, since all the display panel 54, the motors 66*a* through 66*n*, and the heater 48 are turned off, its energy saving effect is greatest. However, it requires the longest rising time for the image forming apparatus 10*a* to become operational because, in particular, the heater 48 requires a long time for heating up.

For automatically operating the image forming apparatus 10*a* in a hospital using the energy saving modes (1) through (3) and the OFF mode, a format as shown in FIG. 6 is generated. The format illustrates mode selections for automatically operating the image forming apparatus 10*a* in a hospital for one week.

As shown in FIG. 6, the hospital takes Wednesday, Saturday, and Sunday off as nonconsultation days (nonbusiness days) and takes Monday, Tuesday, Thursday, and Friday as consultation days (working days) in each week. The hospital has a longer lunch break for Friday. For each nonconsultation day, the hospital starts its nonconsultation activity at 9 AM. The lunch break extends from noon to 1 o'clock for Monday, Tuesday, and Thursday, for example, and from noon to 2 o'clock for Friday, for example.

On Wednesday, Saturday, and Sunday as nonconsultation days, the calendar timer mechanism 70 sets the image forming apparatus 10*a* to the OFF mode so that the energy saving effect is maximum all day long. On the mornings of Thursday and Monday, following nonconsultation days, the OFF mode automatically changes to the ON mode. When the relatively short lunch break begins on Monday, Tuesday, and Thursday, the ON mode shifts to the energy saving mode (1) whose rising time is the quickest, and when the lunch break ends on Monday, Tuesday, and Thursday, the energy saving mode (1) shifts back to the ON mode. When the relatively long lunch break begins on Friday, the ON mode shifts to the energy saving mode (2) whose energy saving effect is higher than the energy saving mode (1).

On Monday and Thursday nights, the ON mode shifts to the energy saving mode (3) whose rising time is shorter than the OFF mode and whose energy saving effect is relatively high for the purpose of quickly entering the ON mode the next morning. On Tuesday and Friday nights, which are followed by nonconsultation days, the ON mode shifts to the OFF mode whose energy saving effect is the greatest.

In the present embodiment, as described above, the calendar timer mechanism 70 provides the OFF mode for turning off all the controlled modes, the ON mode for turning on all the controlled modes, and two or more energy saving modes, e.g., three energy saving modes (1), (2), and (3), for selectively turning off desired controlled objects or placing them in a low power consumption state. Considering how the image forming apparatus 10*a* operates in the hospital, e.g., in view of the nonconsultation days and lunch breaks, the energy saving modes (1), (2), and (3) are set as desired based on the relationship between energy saving effects and rising times.

Specifically, the energy saving effect and the rising time are countervailing factors (see FIG. 5). If the OFF mode with the large energy saving effect is set, then the rising time becomes considerably longer. On Wednesday, Saturday, and Sunday when the preset turn-off time is long, the image forming apparatus 10*a* is set to the OFF mode with the greatest energy saving effect all day long. During lunch breaks with the short turn-off time, the energy saving mode (1) or (2) with the small energy saving effect and the short rising time is selected.

Therefore, the calendar timer mechanism 70 can provide more sensitive energy saving countermeasures to achieve a larger energy saving effect as a whole than the conventional calendar timer device which only sets times to turn on and off the power supply. When the image forming apparatus 10*a* is automatically controlled by the calendar timer mechanism 70 according to the present embodiment, the image forming apparatus 10*a* can easily perform an efficient and economical thermal development process.

If there is a possibility of operating the image forming apparatus 10*a* at night, then the calendar timer mechanism 70 does not shift from the ON mode directly to the energy saving mode (3) on, for example Monday nights, but during such times can set the energy saving mode (1) and/or the energy saving mode (2). As a result, the image forming apparatus 10*a* can be operated quickly to meet sudden demands.

The calendar timer mechanism 70 is capable of displaying the current mode of the image forming apparatus 10*a* on the display panel 54, for example. It is preferable for the calendar timer mechanism 70 to control LEDs (Light-Emitting Diodes) to be energized continuously or intermittently, or to emit different colors for allowing the user to visually recognize transitions between the modes.

When the image forming apparatus 10*a* is placed in the ON mode, it performs a process of forming a visible image on a recording medium F. Specifically, the CPU 60 sends drive signals to the motor controllers 68*a* through 68*n* to energize the motors 66*a* through 66*n*. Recording mediums F loaded in the photosensitive medium supply device 14 are taken one at a time from the loader 24 or 26 by suction cups 28 or 30, and delivered to the image exposure device 16 by the feeder 20.

In the image exposure device 16, the exposure unit 34 generates a light beam L modulated depending on desired image data, and the light beam L is applied to the recording medium F while being periodically deflected in the main scanning direction. The recording medium F is fed in the auxiliary scanning direction indicated by the arrow X by the feed roller pairs 38, 40 of the auxiliary scanning feeding means 36. The recording medium F is thus two-dimensionally scanned and exposed to the light beam L, for recording a latent image thereon.

The recording medium F with the latent image recorded thereon by the image exposure device 16 is then fed to the thermal development device 18 by the feeder 20. In the thermal development device 18, the recording medium F is inserted between the heating drum 42, which has been heated to a predetermined temperature by the heater 48, and the endless belt 44. As the recording medium F is gripped and fed along the circumferential surface of the heating drum 42, the latent image on the recording medium F is thermally developed into a visible image. The recording medium F with the developed visible image thereon is peeled off the heating drum 42 by the peeler blade 46, and then stacked in the tray 52.

In FIG. 6, it is shown that preset modes become effective within preset corresponding time zones. However, an automatic sleep function may be added for automatically changing any energy saving mode, so long as heating-up of the heater 48 will not be obstructed, when it is detected that the image forming apparatus 10*a* has not been operated for a predetermined period of time. In addition, the calendar timer mechanism 70 may be arranged to allow the user to set and distinguish from each other those time zones (e.g., time zones delimited by 15-minute time intervals) in which the automatic sleep function is effective and time zones in which the automatic sleep function is ineffective.

The consultation day setting function unit 71, which is provided as a function of the calendar timer mechanism 70 for additionally setting holidays, consultation days, and nonconsultation days, in addition to the above settings for the days of the week, will be described below with reference to FIGS. 7 through 11.

The consultation day setting function unit 71 serves to make settings in addition to the energy saving modes set as shown in FIG. 6. Items that are set by the consultation day setting function unit 71 are executed in preference to the settings shown in FIG. 6.

The consultation day setting function unit 71 cooperates with the CPU 60 to make settings based on the images shown in FIGS. 7 through 10, which are displayed on the display panel 54. The server 102 can also display the same images on its display unit, and can set information concerning nonconsultation days, nonconsultation time zones, and regional calendar details.

Figure 7:
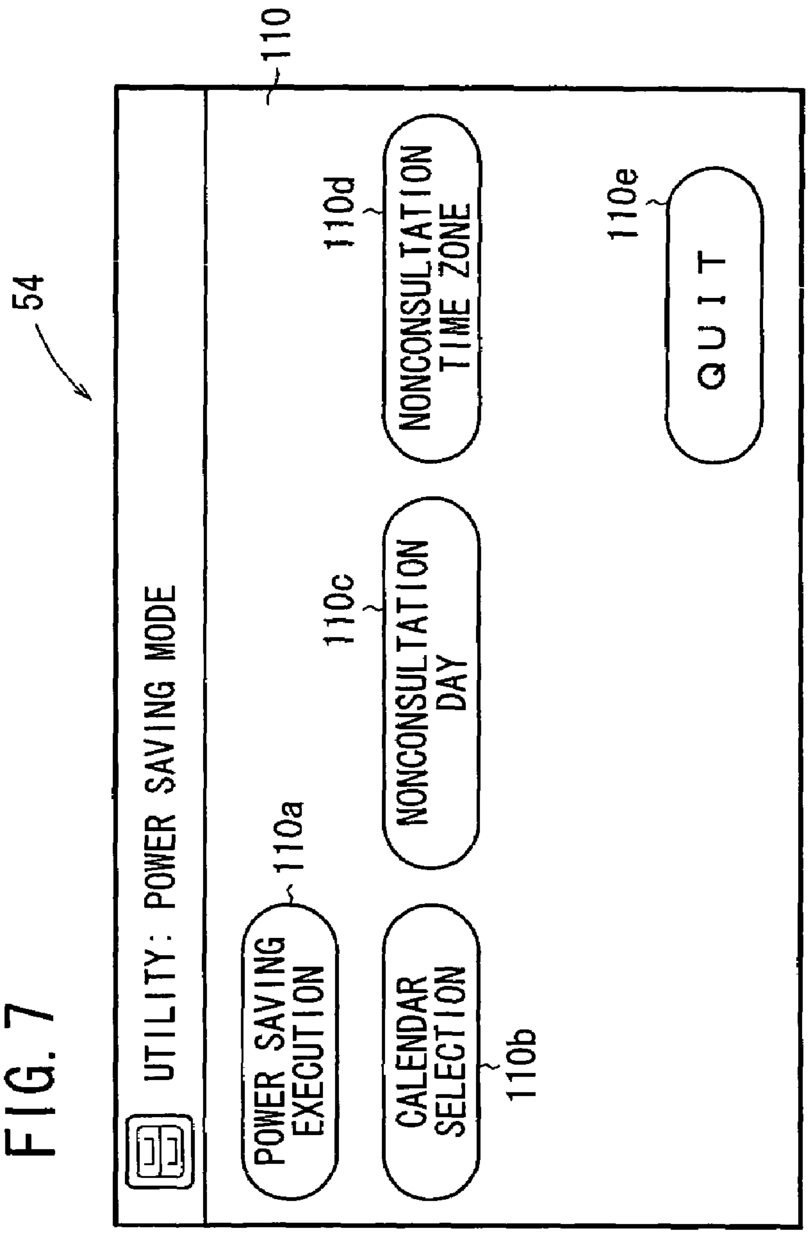
FIG. 7 is a view showing a power saving mode image displayed on a display panel.

FIG. 7 shows a power saving mode image 110, which is a main image for making settings with the consultation day setting function unit 71. When a power saving mode execution button 110*a* on the power saving mode image 110 is selected (clicked) with a given pointing device, the image forming apparatus 10*a* immediately shifts into a set energy saving mode. When a calendar selection button 110*b*, a nonconsultation day setting button 110*c*, or a nonconsultation time zone setting button 110*d* on the power saving mode image 110 are clicked, the power saving mode image 110 shifts to a calendar selection image 120 (see FIG. 8), a nonconsultation day setting image 130 (see FIG. 9), or a nonconsultation time zone setting image 140 (see FIG. 10), respectively. When a QUIT button 110*e* is clicked, the power saving mode image 110 is closed.

Figure 8:
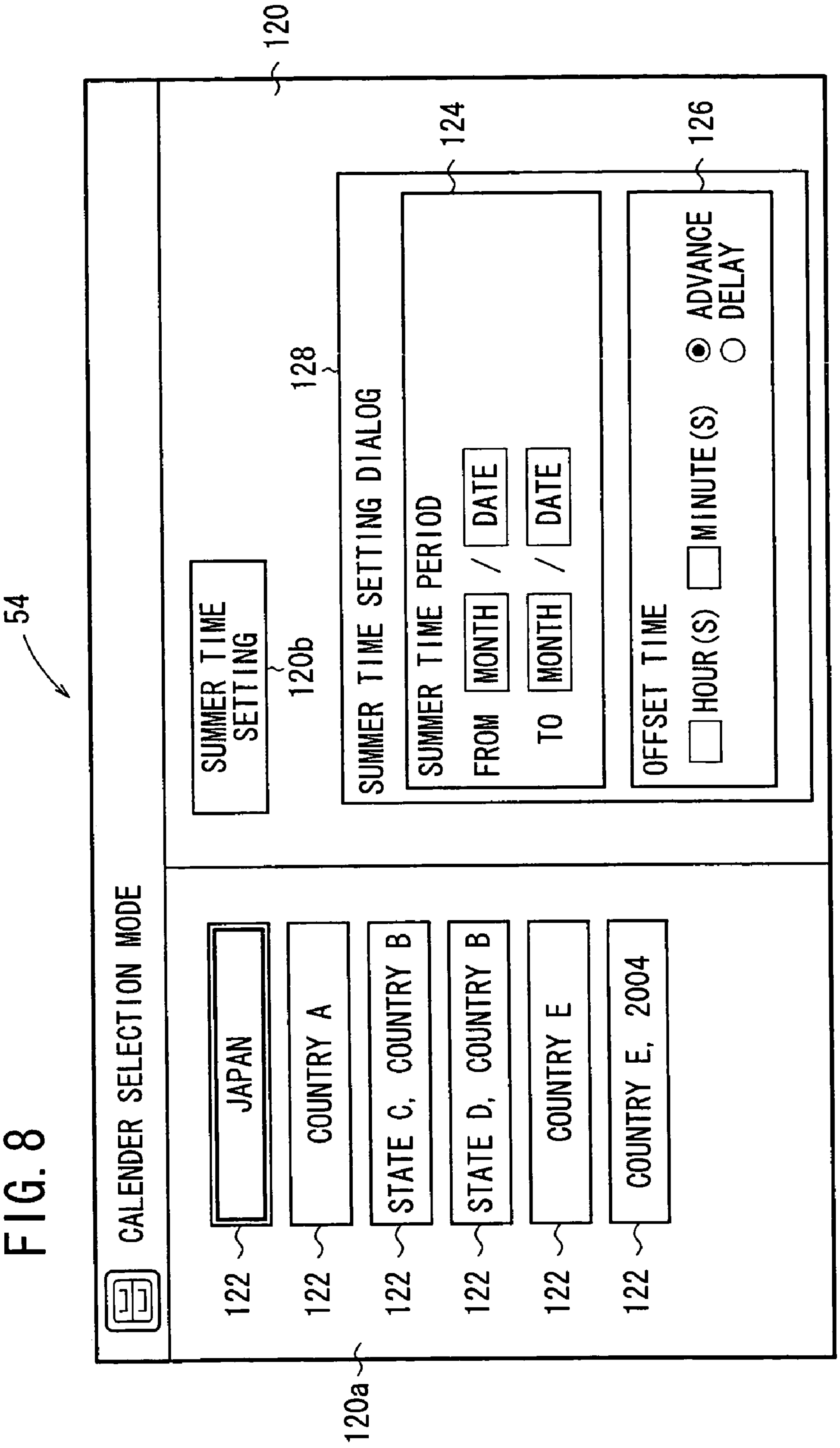
FIG. 8 is a view showing a calendar selection image displayed on the display panel.

As shown in FIG. 8, the calendar selection image 120 displays a calendar selection area 120*a* and a summer time setting button 120*b*. The calendar selection area 120*a* displays calendar data 122 of respective regions stored in the memory 72. When one of the calendar data 122 is clicked and selected, it is displayed in a double (dual-line) frame. In the example shown in FIG. 8, "JAPAN" is selected. The calendar data 122 selected in the calendar selection area 120*a* serves as an initial value for displaying holidays in the nonconsultation day setting image 130 shown in FIG. 9.

The calendar data 122 are data having weekday information and holiday information of different countries, stored in respective file formats for those countries. The holiday information of the calendar data 122 is automatically set also with respect to holidays which may fall on certain numbered weekdays within certain months, such as Coming-of-Age Day in Japan (which falls on the second Monday of January).

The calendar data 122 can also be set for various regions. For example, "State C" and "State D" may be selected for "Country B". Since holidays may change even within the same country or region, in this case, calendar data 122 corresponding to a new calendar may be selected. For example, "Country E 2004" which represents calendar data 122 corresponding to a calendar for year 2004 or later may be selected for Country E. The calendar data 122 represented by "Country E 2004" corresponds not only to the single year of 2004, but also the years of 2005 and after, including leap years. The calendar data 122 can additionally read from an external recording medium, a wide-area communication network, or the like.

When the summer time setting button 120*b* is clicked, a dialog image 128, including an area 124 for setting summer time period information and an area 126 for setting offset time information, is displayed in the calendar selection image 120. In a summer time period that is set in the area 124 of the dialog image 128, the corresponding energy saving modes are performed with a delay represented by an offset time that is set in the area 126. As a result, the calendar timer mechanism 70 is compatible with summer (daylight savings) time.

If the nonconsultation days of the hospital where the image forming apparatus 10*a* is used are Sundays and other regional holidays only, and do not include half-day holidays, then it is possible to set energy saving modes for the image forming apparatus 10*a* simply by selecting a calendar file for the region where the image forming apparatus 10*a* is used. Stated otherwise, if no detailed energy saving mode settings are required, then the settings made using the nonconsultation day setting image 130 (see FIG. 9) and the nonconsultation time zone setting image 140 (see FIG. 10) may be dispensed with.

Figure 9:
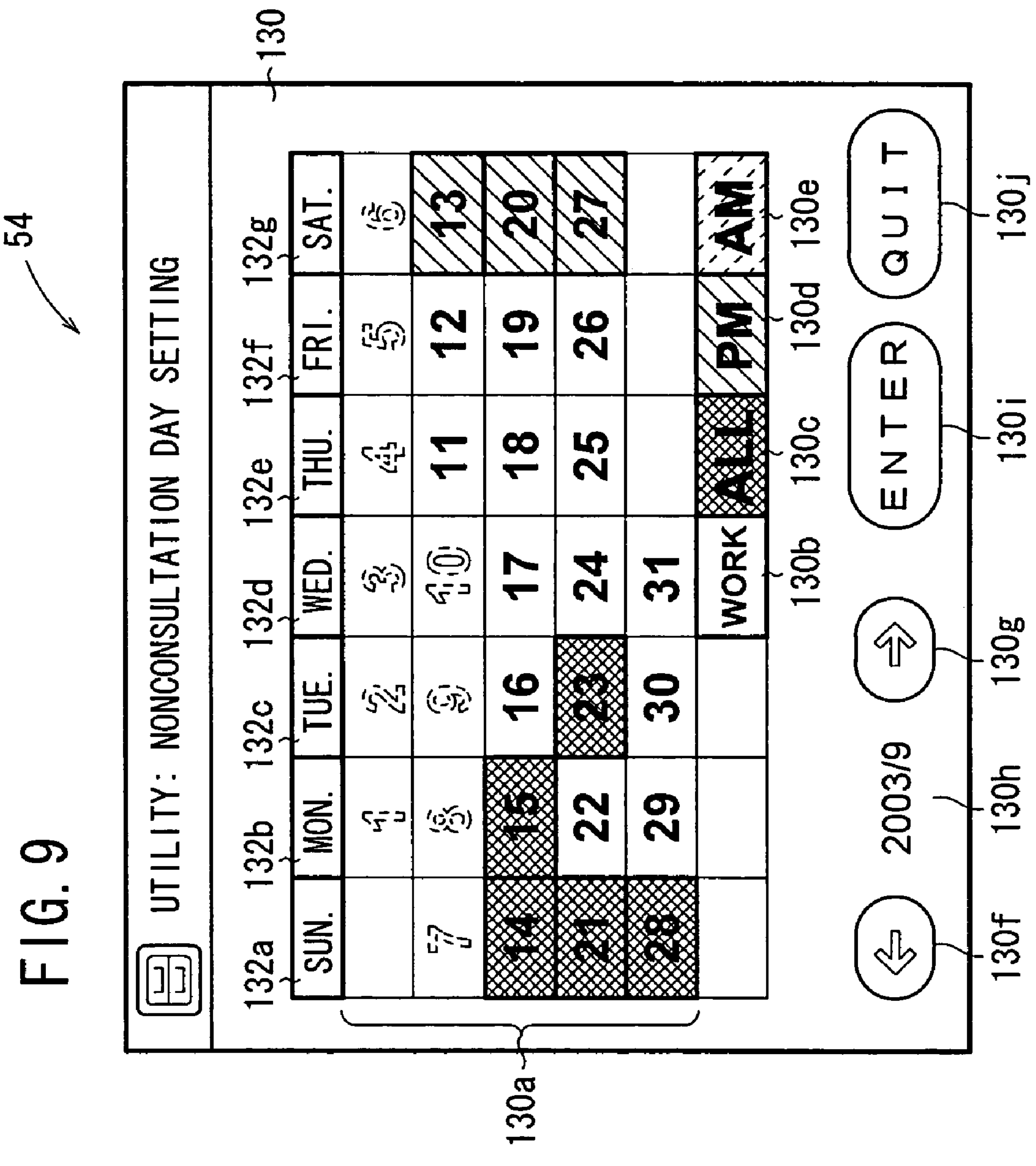
FIG. 9 is a view showing a nonconsultation day setting image displayed on the display panel.

The nonconsultation day setting image 130 shown in FIG. 9 is an image for setting nonconsultation days. The nonconsultation day setting image 130 displays day buttons 132*a*, 132*b*, 132*c*, 132*d*, 132*e*, 132*f* and 132*g* corresponding from Sunday to Saturday, date buttons 130*a* for displaying dates of an indicated month in association with the day buttons 132*a* through 132*g*, a WORK button 130*b* for setting consultation days, an ALL button 130*c* for setting nonconsultation days, a PM button 130*d* for setting afternoon half-day holidays, and an AM button 130*e* for setting forenoon half-day holidays.

The nonconsultation day setting image 130 also displays a month advancing button 130*f* and a month retreating button 130*g*, both for designating a month to be set, a month display area 130*h* for displaying a month which is currently being set, an ENTER button 130*i* for entering setting details, and a QUIT button 130*j* for closing the nonconsultation day setting image 130.

In an initial state, the nonconsultation day setting image 130 displays information of a month having days in which operations are to be performed. Each time the month advancing button 130*f* or the month retreating button 130*g* is clicked, the month to be set is advanced or retreated, updating the dates displayed by the date buttons 130*a* and the month displayed by the month display area 130*h*.

Among the date buttons 130*a*, date buttons 130*a* representing dates that have elapsed are displayed with broken lines to indicate that those dates cannot be set. Specifically, the nonconsultation day setting image 130 shown in FIG. 9 is an example of an image that would be displayed assuming operations are performed therewith on Sep. 11, 2003, wherein dates on and before September 10 are displayed with broken lines. Referring to the calendar data 122, which is selected using the calendar selection image 120 in an initial state, date buttons 130*a* representing holidays are displayed with cross-hatching, for indicating nonconsultation days. Since the nonconsultation day setting image 130 shown in FIG. 9 is displayed with reference calendar data 122 based on the Japanese calendar, the dates of September 15 and 23 are displayed with cross-hatching.

For changing initial settings, for example, when a consultation day is changed to a nonconsultation day, the ALL button 130*c* is first clicked, and then a date button 130*a* corresponding to the day in question is clicked. The date corresponding to the clicked date button 130*a* is now displayed with cross-hatching, thereby changing the consultation day to a nonconsultation day. Conversely, for changing a nonconsultation day to a consultation day, the WORK button 130*b* is first clicked, and then a date button 130*a* corresponding to the day in question is clicked. The date corresponding to the clicked date button 130*a* is now displayed as blank, thereby changing the nonconsultation day to a consultation day.

Similarly, for changing a nonconsultation day or a consultation day to an afternoon half-day holiday or to a forenoon half-day holiday, the PM button 130*d* or the AM button 130*e* is clicked, and then a date button 130*a* corresponding to the day in question is clicked. The date at the clicked date button 130*a* is now displayed with cross-hatching, indicating an afternoon half-day holiday, or is displayed with broken-line cross-hatching, indicating a forenoon half-day holiday.

After clicking the WORK button 130*b*, the ALL button 130*c*, the PM button 130*d* or the AM button 130*e*, if one of the day buttons 132*a* through 132*g* is clicked, all settings of the days corresponding to the clicked day button are changed. In the example of the date buttons 130*a* shown in FIG. 9, when the day button 132*g* is clicked after the PM button 130*d* has been clicked, all the Saturdays are set to afternoon half-day holidays. If the Wednesdays are nonconsultation days as shown in FIG. 6, then the day button 132*d* may be clicked after the ALL button 132*c* has been clicked. When the day button 132*d* is thus clicked, all the Wednesdays are set to nonconsultation days, and regardless of the Wednesday settings shown in FIG. 6, the image forming apparatus 10*a* on Wednesday is forcibly set to an energy saving mode or the OFF mode with respect to the month to be set.

On the nonconsultation day setting image 130, day settings are made with respect to a given month to be set. However, day settings may be made with respect to all months by performing certain control actions.

Days that have elapsed, consultation days, nonconsultation days, afternoon half-day holidays, and forenoon half-day holidays may be displayed in different colors on the date buttons 130*a* for better visual recognition.

Figure 10:
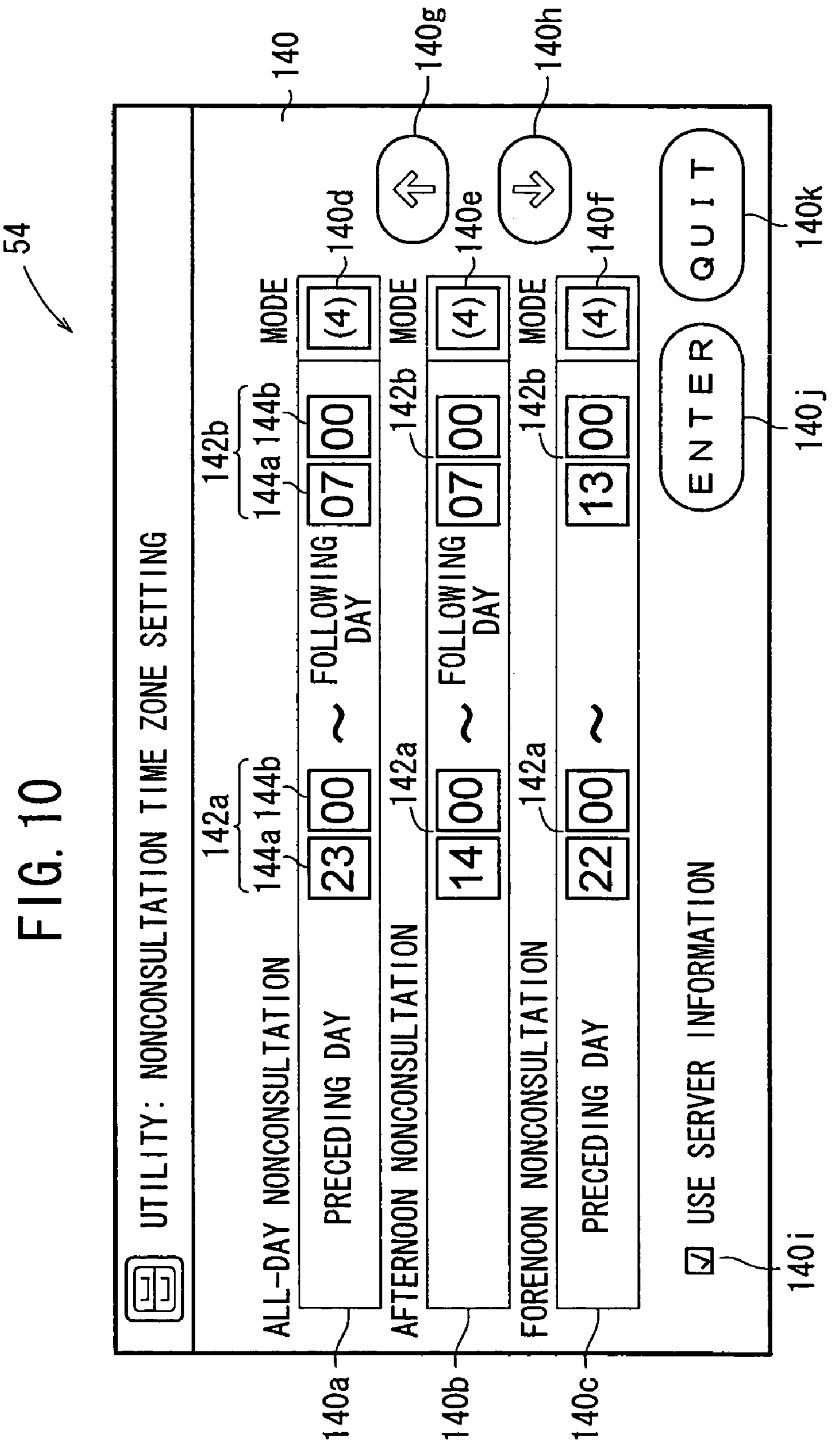
FIG. 10 is a view showing a nonconsultation day time zone setting image displayed on the display panel.

As shown in FIG. 10, the nonconsultation time zone setting image 140 displays an all-day nonconsultation setting area 140*a* for setting a nonconsultation time zone on a nonconsultation day, an afternoon nonconsultation setting area 140*b* for setting an afternoon nonconsultation time zone on an afternoon half-day holiday, and a forenoon nonconsultation setting area 140*c* for setting a forenoon nonconsultation time zone on a forenoon half-day holiday. The nonconsultation time zone setting image 140 also displays a nonconsultation day mode setting area 140*d*, an afternoon half-day holiday mode setting area 140*e*, and a forenoon half-day holiday mode setting area 140*f* for setting energy saving modes on nonconsultation days, afternoon half-day holidays, and forenoon half-day holidays, respectively. Furthermore, the nonconsultation time zone setting image 140 displays an UP button 140*g* and a DOWN button 140*h* for setting various numerical values on the nonconsultation time zone setting image 140, a server information check box 140*i* for using information of the server 102 (see FIG. 3), an ENTER button 140*j* for entering settings, and a QUIT button 140*k* for closing the nonconsultation time zone setting image 140.

Each of the all-day nonconsultation setting area 140*a*, the afternoon nonconsultation setting area 140*b*, and the forenoon nonconsultation setting area 140*c* has a time zone start setting area 142*a* and a time zone end setting area 142*b* each for setting times. Specifically, after an hour entering window 144*a* or *a* minute entering window 144*b* of the time zone start setting area 142*a* and the time zone end setting area 142*b* are clicked, the UP button 140*g* or the DOWN button 140*h* may be clicked to increment or decrement an hour or minute setting. The UP button 140*g* or the DOWN button 140*h* may change the minute setting in the minute entering window 144*b* at intervals of 15 minutes, for example.

In the all-day nonconsultation setting area 140*a* and the forenoon nonconsultation setting area 140*c*, the time zone start setting areas 142*a* can set times for the forenoon of the current day and times for the afternoon of the preceding day. In the all-day nonconsultation setting area 140*a* and the afternoon nonconsultation setting area 140*b*, the time zone end setting areas 142*b* can set times for the afternoon of the current day and times for the forenoon of the following day. Since times can thus be set from time zones in the afternoon of the preceding day to time zones in the forenoon of the following day, the image forming apparatus 10*a* can continuously be set to an energy saving mode up to 7 AM, for example, for a consultation day which follows a nonconsultation day that has been set on the nonconsultation day setting image 130. Stated otherwise, nonconsultation time zones, afternoon nonconsultation time zones, and forenoon nonconsultation time zones can be extended in preference to the settings on the following day and the preceding day on the nonconsultation day setting image 130.

After the nonconsultation day mode setting area 140*d*, the afternoon half-day holiday mode setting area 140*e*, or the forenoon half-day holiday mode setting area 140*f* has been clicked, the UP button 140*g* or the DOWN button 140*h* is clicked a suitable number of times to set one of the energy saving modes (2) through (6) on a nonconsultation day, an afternoon half-day holiday, or a forenoon half-day holiday in the nonconsultation day mode setting area 140*d*, the afternoon half-day holiday mode setting area 140*e*, or the forenoon half-day holiday mode setting area 140*f*. Numerical values displayed in the nonconsultation day mode setting area 140*d*, the afternoon half-day holiday mode setting area 140*e*, and the forenoon half-day holiday mode setting area 140*f* correspond to the numerical values of the energy saving modes shown in FIG. 4. The mode represented by (1) is the ON mode and is excluded. When the numerical value (4) representing the OFF mode is set in the nonconsultation day mode setting area 140*d*, the afternoon half-day holiday mode setting area 140*e*, and the forenoon half-day holiday mode setting area 140*f*, the nonconsultation time zone, the afternoon nonconsultation time zone, and the forenoon consultation time zone are forcibly set to the OFF mode regardless of the settings shown in FIG. 6. On a day that is set as a consultation day on the nonconsultation day setting image 130 shown in FIG. 9, the settings shown in FIG. 6 are effective in a time zone that is not affected by an extension of the nonconsultation time zone, the afternoon nonconsultation time zone, or the forenoon nonconsultation time zone, on the preceding day or the following day of the settings in the nonconsultation time zone setting image 140.

A check mark in the server information check box 140*i* switches between a displayed state and a non-displayed state each time the server information check box 140*i* is checked. When the check mark is displayed in the server information check box 140*i*, information from the server 102 (see FIG. 3) can be used. When the check mark is displayed in the server information check box 140*i*, the information set by the server 102 is used in preference to the data set by the image forming apparatus 10*a*, making it possible to share the information from the server 102. This process is performed by the consultation day setting function unit 71, in cooperation with the CPU 60 and the memory 72, based on the control program 72*a*.

Figure 11:
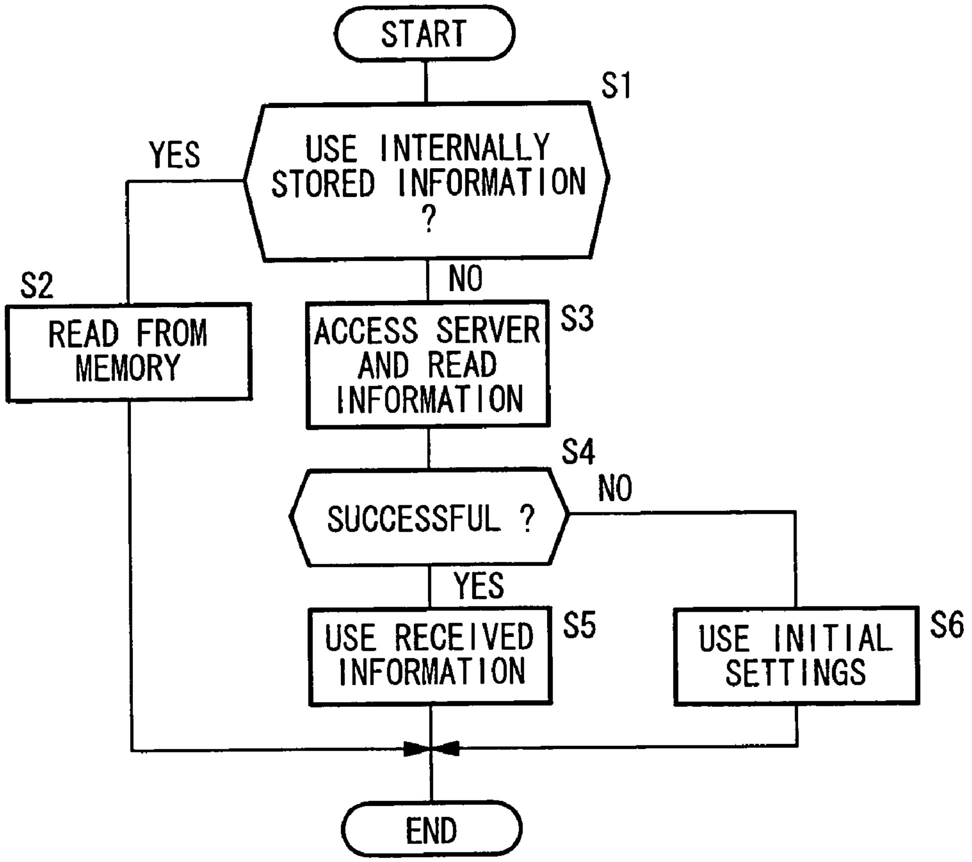
FIG. 11 is a flowchart of a processing sequence of the image forming apparatus for using information from a server.

A processing sequence based on the control program 72*a* will be described in detail below with reference to FIG. 11. The control program 72*a* is read from an external recording medium, a wide-area communication network, or the like, into the program storage area of the memory 72 by the CPU 60, and executed by the CPU 60.

In step S1, the image forming apparatus 10*a* determines whether it uses information in the internal memory 72 thereof or not. Specifically, if no check mark is displayed on the nonconsultation time zone setting image 140, then it is judged that the image forming apparatus 10*a* uses the information from its own memory 72, and control goes to step S2. If the check mark is displayed in the nonconsultation time zone setting image 140, then it is judged that the image forming apparatus 10*a* uses information from the server 102, and control goes to step S3.

In step S2, the information currently set at that time within the various images is read. Alternatively, if there is information that has been previously set saved in the memory 72, then that information is read from the memory 72.

In step S3, the image forming apparatus 10*a* accesses the server 102 and requests the server 102 to supply information. The server 102, having received the request, supplies the information saved in its own memory through the network 100 to the image forming apparatus 10*a*.

In step S4, the image forming apparatus 10*a* receives the data supplied from the server 102. If reception of the data is successful, then control goes to step S5. If reception of the data fails, control goes to step S6. The branching process in step S4 is performed to increase the reliability of the image forming apparatus 10*a*. Normally, the image forming apparatus 10*a* does not fail to receive data from the server 102.

In step S5, the CPU 60 stores the information received from the server 102 into a certain storage area of the memory 72 and uses the stored information. At this time, the CPU 60 does not write the information from the server 102 over the information already held by the image forming apparatus 10*a*.

In step S6, the CPU 60 displays any information reception failures on the display panel 54, while also storing initial settings into a certain storage area of the memory 72 and uses the stored initial settings. The initial settings represent data that are set to the extent that they cause no trouble in the operation of the image forming apparatus 10*a*.

On the nonconsultation time zone setting image 140 displayed by the server 102, the server information check box 140*i* is not displayed, but a forced information distribution check box (not shown) is displayed. When the forced information distribution check box is checked to display a check mark thereon, the information of the server 102 is forcibly distributed to the image forming apparatus 10*a* through 10*n* and can be forced to be used thereby, irrespective of whether the check marks are displayed in the server information check boxes 140*i* of the image forming apparatus 10*a* through 10*n* or not.

As for processes by which information from the server 102 may be shared with the image forming apparatus 10*a*, etc., apart from temporarily transmitting and supplying the information from the server 102 to the image forming apparatus 10*a*, processes may be used by which the information is supplied successively as needed, or by which the memory 72 itself may appear to be commonly shared. The functions of the server 102 may also be provided by one any one of the image forming apparatus 10*a* through 10*n*.

While operation of the image forming apparatus 10*a* has mainly been described above, the other image forming apparatus 10*b* through 10*n* operate in the same manner as the image forming apparatus 10*a*.

As described above, the calendar timer mechanism 70 according to the present embodiment can make additional settings with respect to the energy saving modes shown in FIG. 6, by operating the consultation day setting function unit 71, making it possible to set times flexibly and in detail.

For example, by setting consultation days and nonconsultation days on each day or weekday, based on calendar data 122 including weekday information and holiday information, the image forming apparatus 10*a* through 10*n* can be set to energy saving modes within desired nonconsultation day time zones on nonconsultation days and on Sundays and holidays which are not consultation days. Thus, the amount of energy consumed by the image forming apparatus 10*a* through 10*n* can easily be reduced.

Regional and yearly calendars can be applied to allow the image forming apparatus 10*a* to set energy saving modes to match different holidays in various regions of the world through simple control actions.

If the image forming apparatus 10*a* through 10*n* are expected to have the same settings with respect to energy saving modes, then the server 102 alone may be used to set information as to energy saving modes, and the check mark will be displayed on the server information check box 140*i* of the image forming apparatus 10*a* through 10*n*. In this manner, the time required to set energy saving modes in the image forming apparatus 10*a* through 10*n* is greatly reduced.

In the present embodiment, the calendar timer mechanism 70 and the consultation day setting function unit 71 are incorporated in the image forming apparatus 10*a* through 10*n*. However, the calendar timer mechanism 70 and the consultation day setting function unit 71 are not limited to use in the image forming apparatus 10*a* through 10*n*, but may be incorporated in various processing apparatus such as a medical image processing system, a medical print system, etc.

Although a certain preferred embodiment of the present invention has been shown and described in detail, it should be understood that various changes and modifications may be made therein without departing from the scope of the appended claims.

What is claimed is:

1. An image processing system comprising:

a plurality of controlled objects, each controlled object defining energy savings and rising time;

a calendar timer mechanism which is switchable according to a timer between a normal mode for supplying energy to a controlled object and plurality of energy saving modes for reducing an amount of energy consumed by said controlled object, wherein based on calendar data including weekday information and holiday information and that sets a working day and/or a nonbusiness day for each day or weekday, the amount of energy consumed by said controlled object is reduced by said energy saving mode in a preset nonbusiness time zone, on nonbusiness days, and on Sundays and holidays which are not working days; wherein each of said plurality of energy savings modes is set to turn off a pre-selected number of said controlled objects based on unique relationship between energy savings and rising times of said controlled objects.

2. An image processing system according to claim 1, wherein said calendar data sets a half-day holiday for each day or weekday, and the amount of energy consumed by said controlled object is reduced by said energy saving mode in a half-day holiday time zone included in preset information on the set half-day holiday.

3. An image processing system according to claim 1, wherein said nonbusiness time zone can be set to include an afternoon time zone for days preceding nonbusiness days and Sundays and holidays which are not working days and a forenoon time zone for days following nonbusiness days and Sundays and holidays which are not working days.

4. An image processing system according to claim 1, wherein said calendar data is selectable from a plurality of regional data anchor yearly data having different holiday information.

5. An image processing system according to claim 1, wherein said controlled object comprises a plurality of processing apparatus, and said calendar data having working day information and/or nonbusiness day information set therein can be shared and set by the plurality of processing apparatus.

6. An image processing system according to claim 1, wherein summer time information can be set, including period information and offset time information, and said energy saving mode is performed at a time shifted by a time represented by said offset time information within a period represented by said period information.

7. An image processing system according to claim 1, wherein said normal mode comprises an ON mode for turning on said controlled object, and said energy saving mode includes an OFF mode for turning off said controlled object and at least two auxiliary energy saving modes for selectively bringing said controlled object into an OFF state or a low power consumption state, and wherein times for shifting between at least three of the modes can be set optionally.

8. An image processing system according to claim 1, wherein said controlled object comprises an image forming apparatus having an exposure unit for applying a light beam to a recording medium and a thermal development device having a heat source for developing an image on said recording medium.

9. An image processing system according to claim 1, wherein said rising times of said controlled objects comprises the amount of time necessary for said controlled objects to return to said normal mode after said calendar timer mechanism is switched from one of said plurality of energy saving modes to said normal mode.

10. An image processing system according to claim 9, wherein said rising times of said controlled objects increase as the reduction in the amount of energy consumed by said controlled objects in an energy saving mode increases, and decreases as the reduction in the amount of energy consumed by said controlled objects in an energy saving mode decreases.

11. A control program for controlling a calendar timer mechanism which is switchable between a normal mode for supplying energy to a controlled object and a plurality of energy saving modes for reducing an amount of energy consumed by said controlled object, according to a timer, wherein based on calendar data including weekday information and holiday information that sets a working day and/or a nonbusiness day for each day or weekday, the amount of energy consumed by said controlled object is reduced by said energy saving mode in a preset nonbusiness time zone, on nonbusiness days, and on Sundays and holidays which are not working days;

wherein said controlled object comprises a plurality of controlled elements, each of said controlled elements defining energy savings and rising time; and, wherein said timer comprises a lookup table having entries for each of said plurality of energy savings modes, wherein said entries comprise instruction set to turn off a pre-selected number of said controlled elements based on unique relationship between energy savings and rising times of said controlled elements.

12. A control program according to claim 11, wherein said calendar data a half-day holiday for each day or weekday, and the amount of energy consumed by said controlled object is reduced by said energy saving mode in a half-day holiday time zone included in preset information on the set half-day holiday.

13. A control program according to claim 11, wherein said nonbusiness time zone can be set to include an afternoon time zone for days preceding nonbusiness days and Sundays and holidays which are not working days, and a forenoon time zone for days following nonbusiness days and Sundays and holidays which are not working days.

14. A control program according to claim 11, wherein said calendar data is selectable from a plurality of regional data and/or yearly data having different holiday information.

15. A control program according to claim 11, wherein said controlled object comprises a plurality of processing apparatus, and said calendar data having working day information and/or nonbusiness day information set therein can be shared and set by the plurality of processing apparatus.

16. A control program according to claim 11, wherein summer time information can be set, including period information and offset time information, and said energy saving mode is performed at a time shifted by a time represented by said offset time information within a period represented by said period information.

17. A control program according to claim 11, wherein said normal mode comprises an ON mode for turning on said controlled object, and said energy saving mode includes an OFF mode for turning off said controlled object and at least two auxiliary energy saving modes for selectively bringing said controlled object into an OFF state or a low power consumption state, and wherein times for shifting between at least three of the modes can be set optionally.

18. A control program according to claim 11, further comprising a sleep mode function that automatically controls the controlled object to assume an energy conserving sleep mode whenever the controlled object has not been used for a predetermined amount of time regardless of the current normal mode or energy saving mode of operation of the controlled object.

* * * * *